United States Patent
Qiu et al.

(10) Patent No.: US 8,391,488 B2
(45) Date of Patent: Mar. 5, 2013

(54) METHOD AND APPARATUS FOR USING NAVIGATION SIGNAL INFORMATION FOR GEOENCRYPTION TO ENHANCE SECURITY

(75) Inventors: Di Qiu, Menlo Park, CA (US); Sherman Lo, San Mateo, CA (US); Per Enge, Mountain View, CA (US); Logan Scott, Fort Collins, CO (US); Dan Boneh, Stanford, CA (US); Ron Karpf, Corvallis, OR (US)

(73) Assignees: Geocodex LLC, Tarzana, CA (US); Leland Stanford Junior University, Stanford, CA (US)

( * ) Notice: Subject to any disclaimer, the term of this patent is extended or adjusted under 35 U.S.C. 154(b) by 702 days.

(21) Appl. No.: 12/354,607

(22) Filed: Jan. 15, 2009

(65) Prior Publication Data
US 2009/0316900 A1 Dec. 24, 2009

Related U.S. Application Data

(60) Provisional application No. 61/022,293, filed on Jan. 18, 2008.

(51) Int. Cl.
| | | |
|---|---|---|
| *H04K 1/00* | (2006.01) | |
| *G01S 13/00* | (2006.01) | |
| *H04L 9/32* | (2006.01) | |
| *G06F 7/04* | (2006.01) | |
| *G06F 17/30* | (2006.01) | |
| *G08B 13/00* | (2006.01) | |
| *G01N 23/00* | (2006.01) | |
| *H04L 12/28* | (2006.01) | |
| *G01S 1/00* | (2006.01) | |
| *H04N 7/167* | (2011.01) | |
| *H04N 7/16* | (2011.01) | |
| *G06F 11/30* | (2006.01) | |

(52) U.S. Cl. .............. 380/258; 726/19; 726/30; 726/35; 713/176; 342/22

(58) Field of Classification Search .................. 380/258; 726/30, 35, 19; 713/201, 176; 342/22
See application file for complete search history.

(56) References Cited

U.S. PATENT DOCUMENTS

| | | | | |
|---|---|---|---|---|
| 2004/0078594 A1* | 4/2004 | Scott | .............................. | 713/201 |
| 2005/0091545 A1* | 4/2005 | Soppera | ........................ | 713/176 |
| 2009/0146864 A1* | 6/2009 | Zank et al. | ...................... | 342/22 |

FOREIGN PATENT DOCUMENTS

WO    WO 2008060824 A2 *   5/2008

OTHER PUBLICATIONS

Firoozjaei, M.D.; Vahidi, J.; "Implementing geo-encryption in GSM cellular network"; Communications (COMM), 2012 9th International Conference on Digital Object Identifier: 10.1109/ICComm. 2012.6262569; Publication Year: Mar. 2012, pp. 299-302.*

* cited by examiner

*Primary Examiner* — Andrew Nalven
*Assistant Examiner* — Courtney Fields
(74) *Attorney, Agent, or Firm* — O'Melveny & Myers LLP (57) ABSTRACT

A data encryption and decryption system securely geoencrypts data using location-dependent navigation signals. To increase the entropy of the cryptographic key to guard against a brute-force attack, geoencryption is made to depend on largely time-independent characteristics of the navigation signals that are not easily spoofed, including the time difference of arrival, the envelope-to-cycle difference, the differential signal-to-noise, the signal envelope shape, and the directions of arrival of the navigation signal set.

19 Claims, 11 Drawing Sheets

| Grid Space (m) | # of Bits | Brute Force Attack Time |
|---|---|---|
| $10^{-4}$ | 75 | 283 years |
| $10^{-3}$ | 69 | 2.8 years |
| $10^{-2}$ | 62 | 10 days |
| $10^{-1}$ | 56 | 2.5 hours |
| 1 | 49 | 1.5 minutes |
| $10^{1}$ | 42 | < 1 second |
| $10^{2}$ | 36 | < 1 second |
| $10^{3}$ | 29 | < 1 second |

METHOD AND APPARATUS FOR USING NAVIGATION SIGNAL INFORMATION FOR GEOENCRYPTION TO ENHANCE SECURITY

RELATED APPLICATION

This application claims the benefit of U.S. Provisional Patent Application Ser. No. 61/022,293, filed Jan. 18, 2008.

GOVERNMENT LICENSE RIGHTS

This invention was made with Government support under contract 2000-G-028 awarded by the FAA Technical Center. The Government has certain rights in this invention.

BACKGROUND OF THE INVENTION

1. Field of the Invention

The present invention is directed to controlling access to digital data, and to a system for providing secure communication of information to recipient devices in a manner such that the information can only be communicated or accessed at specified locations. In particular, the present invention is directed at providing enhanced cryptographic strength to encryption methods incorporating geographic and temporal restrictions.

2. Description of Related Art

Traditional methods of securing electronic data rely on encryption to assure that only authorized users can access and use the secure data. Encryption is the use of codes and ciphers to protect data from unintended disclosure or modification. It is primarily used to control access to communications transmitted over open networks, but may also be used to control access to stored data. In a transmission utilizing encryption to protect digital data, the sender converts the original data, or "plaintext," into a coded equivalent called "ciphertext" using an encryption algorithm. The ciphertext is then decoded (or decrypted) by the receiver and thereby turned back into plaintext. The encryption algorithm uses a key, which in digital systems is a string of bits. In general, the larger the number of bits in the key, the longer it takes to break the code using so-called "brute force" methods. A drawback of conventional cryptographic systems is the difficulty of distributing the keys to recipients of encrypted information. If the keys are intercepted by an unauthorized user, then that unauthorized user could gain access to the encrypted information.

As an added layer of security, it has been proposed to further incorporate time and location data into encryption methods such that the secure data can be accessed only at an authorized location and time. See, for example, U.S. Pat. No. 7,143,289, in which Denning et al. introduce the concept of geoencryption, or location-based encryption. Using geoencryption, data can be encrypted with a particular range of geographic and temporal coordinates that prevent decryption of the data unless it takes place within the specified geographic and temporal range. For example, an employer might geoencrypt sensitive employee information making it available only within the employer's facility and during normal business hours. If the data were stolen or the facility broken into, the additional geographic and temporal restrictions would greatly reduce the likelihood that the security of the data could be compromised, even by authorized users. As another example, geoencryption might be used in the distribution of digital cinema to authorized theatres to ensure that the content could be decoded and displayed only at the authorized locations during the authorized times. The concept of geoencryption thus promises tremendous potential benefits in the management and distribution of sensitive or secured data where controlling access is the predominate concern.

However, although the location data used in the encryption process does enhance security, the addition of this one piece of information does not provide enough entropy, or unique information content, to create a sufficiently strong and robust cryptographic system to protect the most valuable data. Furthermore, simply providing additional location signals will not significantly increase the cryptographic strength of the system. Additional unique information is needed to increase the entropy sufficiently to enable a more robust security system. In addition, conventional geoencryption systems can be defeated by unauthorized users who generate false location or time data in order to spoof the decryption system. Additional unique, location-dependent information is needed to provide a cross check on position data to authenticate the source of location data used in the decryption process.

Accordingly, it would be desirable to provide a system that makes use of all location-based parameters of a navigation signal to significantly increase the entropy of the cryptographic key and to perform cross correlations of navigation parameters to authenticate the source of location data in order to generate a strong and robust cryptographic system.

SUMMARY OF THE INVENTION

A data encryption and decryption system securely geoencrypts data using location-dependent navigation signals. One embodiment of such a system in accordance with the present invention includes a geoencryption apparatus that includes a data file to be securely transmitted, a random key to be used for encrypting the data to be securely transmitted, and an encryption device adapted to encrypt the data file to be transmitted with the random key in order to create a coded file. The embodiment also includes a geoencoding device that operates on the random key to geolock it by encoding it with a location-dependent navigation signal. In order to increase the entropy of the encryption, and thereby improve the strength of the cryptography, the geoencoding process is made to depend on certain characteristics of the location-dependent navigation signal set. For example, the encoding process may depend on the time difference of arrival of various components of the navigation signal. It may also depend on the envelope-to-cycle difference (EDC) of the navigation signal. The encoding process may also depend on the differential signal-to-noise ratio (DSNR) of various components of the navigation signal, on the shape of the signal's envelope, or on the direction of arrival of the navigation signal. The encoding process may also depend on other signal parameters and still fall within the scope and spirit of the present invention.

An embodiment of the present invention further includes a geo-decryption device that includes a data receiver for receiving the coded file and a navigation receiver adapted to receive the location-dependent navigation signal, which may be a radio-frequency signal or any other type of signal capable of transmitting location-dependent navigation data. The embodiment also includes a geodecoding device that is adapted to unlock the random key by decoding it using the location-dependent navigation signal received by the navigation receiver. The decoding of the random key may depend on at least one of the time difference of arrival of the navigation signal, the envelope-to-cycle difference, the differential signal-to-noise ratio, the signal envelope shape, and the direction of arrival of the navigation signal.

Making the geoencoding and geodecoding processes dependent on largely time-independent characteristics of the navigation signals that are not easily spoofed, including the time difference of arrival, the envelope-to-cycle difference, the differential signal-to-noise, the signal envelope shape, and the directions of arrival of the navigation signal set, increases the entropy of the cryptographic key and helps to guard against a brute-force attack.

DETAILED DESCRIPTION OF THE PREFERRED EMBODIMENT

The present invention uses the characteristics of a received navigation signal to generate a secure cryptographic key suitable for the geoencryption of data. Encryption parameters are derived from characteristics of the navigation signal itself in order to increase the entropy and thus the strength of the cryptographic system as well as to authenticate the navigation signal and reduce the likelihood of spoofing.

Figure 1:
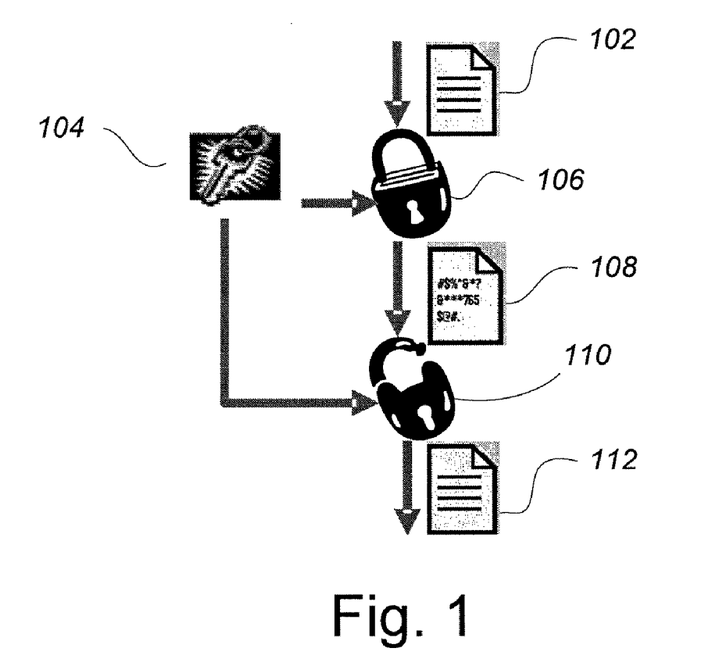
FIG. 1 depicts a conventional cryptographic system used to transmit data using a symmetric key.
Figure 2:
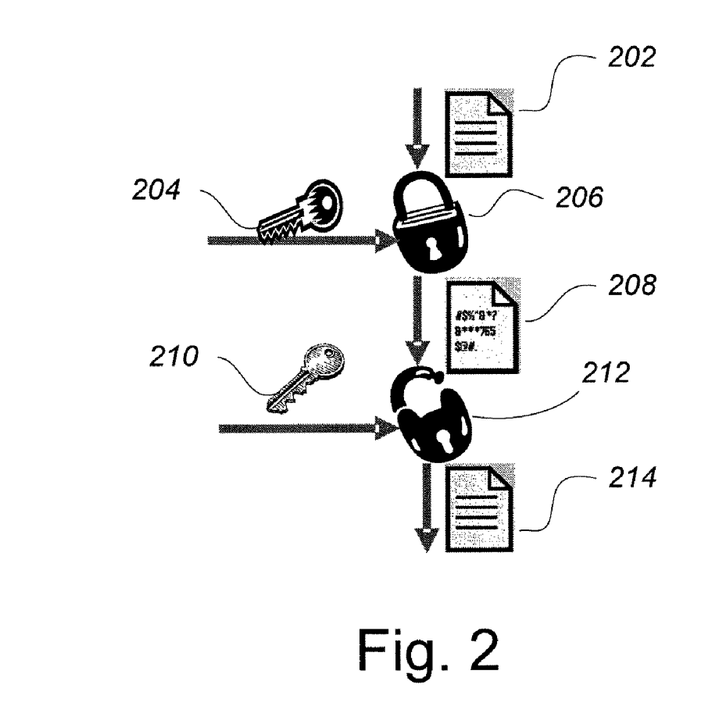
FIG. 2 depicts a conventional cryptographic system used to transmit data using an asymmetric key.

FIG. 1 depicts a conventional cryptographic system used to transmit data, termed plaintext 102, in such a way that it cannot be decoded by unauthorized agents. This is done by using a cryptographic key 104 and algorithm 106 to convert the plaintext 102 into encrypted data or ciphertext 108. Only authorized agents are able to convert the ciphertext 108 back to the plaintext 112. A cryptographic algorithm 106, also called a cipher, is used to perform the transformation. The cipher is a mathematical function that is used for encryption and decryption. There are two general types of key-based algorithms: symmetric and asymmetric (or public-key). Symmetric algorithms are algorithms whereby an encryption key can be calculated from the decryption key and vice versa. In most symmetric algorithms, the encryption key and the decryption key are the same as shown in FIG. 1. These keys are often called session keys. Public-key algorithms are designed so that the keys used for encryption and decryption are different, as shown in FIG. 2. In FIG. 2, the public key 204 is used to encrypt the plaintext 202, and the private key 210 is used to decrypt the ciphertext 208 to recover the plaintext 214. These keys cannot be mutually derived, i.e., the decryption key 210 cannot be derived from the encryption key 204. The encryption key is often called the public key and the decryption key is called the private key.

There are two reasons why public-key algorithms are not used interchangeably with the symmetric algorithm. First, public-key algorithms are slow, about 1000 times slower than the symmetric algorithms. Second, the public-key cryptosystems are vulnerable to chosen-plaintext attacks. Therefore, in most practical implementations, public-key algorithm is used for key management, to secure and distribute session keys. The plaintext is encrypted using the symmetric algorithm. This is called a hybrid algorithm.

Authentication is another important concept in cryptography. It allows the receiver of a message to ascertain its origin. Authentication is not necessarily used in encryption or decryption protocols but it is a key concept in verifying the source of a message. Hash functions are a fundamental building block for many of the authentication protocols. A hash function is a function that takes a variable length input and converts to a fixed length output, called hash value or hash digest. Hash functions are relatively easy to compute but significantly harder to reverse. Beside their one-way nature, the other important property of hash functions is freedom from collisions: it is difficult to generate two inputs with the same hash value.

A message authentication code (MAC), also known as a data authentication code (DAC), is a one-way hash function with the addition of a key. The hash value is a function of both the input and the key. Unlike encryption, authentication doesn't hide the plaintext but instead tags the MAC at the end of the plaintext for the recipient to verify whether the plaintext has been modified during the course of distribution.

Figure 3:
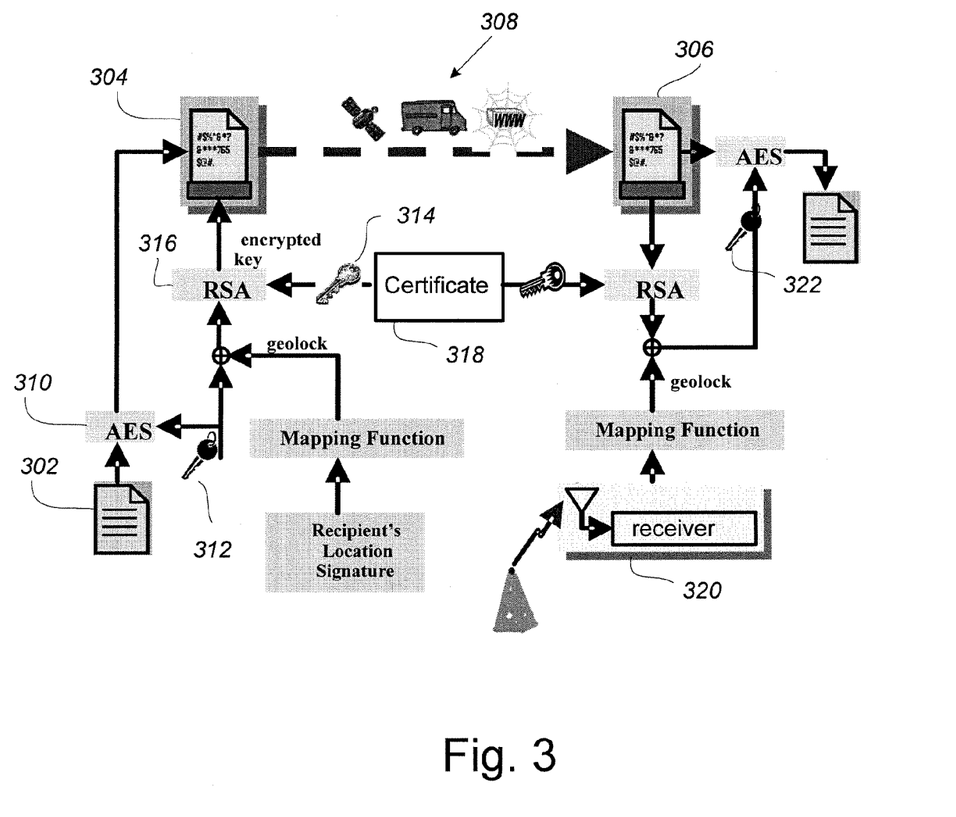
FIG. 3 depicts a system using geoencryption to effect the secure distribution of digital cinema to authorized theatres.

FIG. 3 depicts a particular application of geoencryption applied to digital film distribution. Under this system, a content provider distributes the encrypted film 304 (ciphertext) to an authorized user. This is done via many methods, illustrated at 308, (such as satellite data links) and, as such, may be readily available to unauthorized users. The desire is to have content (digital cinema) encrypted using a geoencryption protocol that is decryptable only at a specified location (theaters). The desire is for the decryption process to fail and not reveal information about the plaintext should there be an attempt to decrypt the data at another location. This should be true whether the attempt is made by an authorized or unauthorized user. Therefore, the geoencryption algorithm can be used to ensure that content cannot be retrieved except at the theater by authorized personnel.

The sender encrypts the data file or plaintext 302 using AES 310, a symmetric cipher, using a random key 312. The random key is transmitted to the authorized user after being encrypted with a key ("geolock") 314 derived from specific user location- and time-dependent parameters. The geolock 314 is generated by mapping the recipient's location information into binary bits. And the geolock-encrypted key is then encrypted again with a public-key cipher, such as RSA 316. To ensure authenticity of the sender/receiver, both the public key and the private key are distributed by a trusted third party, the Certification Authority 318.

In order to enable the geoencryption system, the recipient has three channels to receive information. First, a data receiver is needed to capture the digital encrypted data file 306. Second, a navigation receiver 320 is needed to receive RF signals whose location-dependent parameters are needed to generate the geolock. Third, a channel 318 is necessary for secure key exchange. If geolock is correct, the decryption process is performed using the correct random key 322 to decode the received encrypted data file 306.

Figure 4:
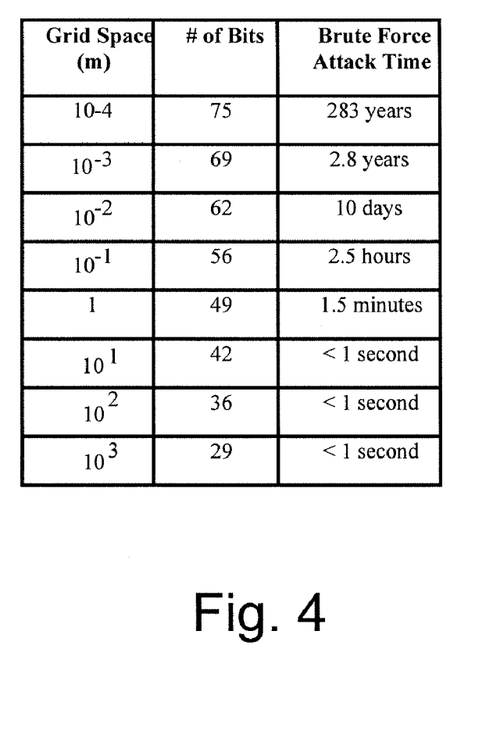
FIG. 4 illustrates the time required to break a conventional geoencrypted code using a brute-force hardware attack.

However, location data itself, as used by prior art systems, may not be adequate for generating the geolock due to insufficient randomness or entropy. For example, we might overlay the entire Earth with a fine grid and uniquely identify each grid box. The size of each box will depend on the precision of the positioning sensor. The information content available is the minimum number of bits necessary to create that representation. With very high performance hardware used to stage a brute-force attack, the time required to finish searching all the possible combinations can be estimated. FIG. 4 depicts the equivalent number of bits and time required to break the encryption using a $10,000 hardware attack in 2005. The brute-force attack machine is built with key search chips. Each chip can test keys at a rate of 50 million per second (in 1995). The more chips that are used, the less time and cost is required to search an entire key space. The estimate takes into account a drop in device cost of a factor of ten every five years. Thus, without a significant increase in entropy, a brute-force attack will eventually break a conventional geoencryption.

In one embodiment in accordance with the present invention, location-dependent navigation signal characteristics that adapt well for use in geoencryption are employed to increase the entropy of the cryptographic system in order to create a stronger key. In particular, an embodiment of the present invention comprises a geoencryption system that is adapted to use the characteristics of the Long-Range Navigation ("Loran") system navigation signals to create a location-dependent cryptographic key. Loran is a terrestrial, low-frequency, pulsed navigation system that operates in much of the northern hemisphere. Its signal characteristics have many properties that are useful for geoencryption. Furthermore, it is being modernized to a next generation system known as enhanced Loran (eLoran) which will have additional capabilities that can benefit its use for geoencryption in accordance with the present invention.

In an embodiment in accordance with the present invention, a geoencryption system is adapted to generate an encryption key that is based on the following location-dependent parameters of the Loran navigation system signals: the time difference of arrival (TDOA), the envelope to cycle difference (EDC), the difference of signal-to-noise ratio ($\Delta$SNR), the shape of the signal envelope, and the direction of signal arrival. However, it should be appreciated that additional location-dependent parameters of the Loran navigation signals can also be used within the scope and spirit of the present invention. Likewise, signal parameters of navigational systems other than Loran may exhibit properties that would make them suitable for geoencryption applications, and they would also fall within the spirit and scope of the present invention.

The signal parameters discussed above are suitable for enhanced geoencryption for a number of reasons. First, they depend on location while being minimally sensitive to time. This ensures repeatability and allows a recipient to provide his location-dependent parameters of the derived geolock to the sender at one time and be assured that those parameters will still be valid at a latter time. In other words, the signal characteristics are consistent enough that when the recipient is ready to decrypt, measurements at the same location will yield the same geolock that was previously generated. Loran data collected at Stanford University for several hours on Jan. 8, 2006 exhibited a position error in the east-west direction of less than 10 meters and an error in north-south direction of less than 25 meters.

Second, these parameters produce adequate location-dependent information to generate a strong geolock key. Because Loran is transmitted from static transmitters, a large number of parameters associated with the navigation signals are substantially dependent only on location. This is important because the security strength of the geolock is derived from the information content or entropy of the information used to generate it. More parameters, as well as increased accuracy of those parameters, increase the entropy.

Third, these parameters are not easily spoofed. If the signal is vulnerable to spoofing, it may be possible for an adversary to bypass the location check and decrypt correctly. However, Loran is a high-power, low frequency signal making it difficult to spoof or jam. Furthermore, the signal can reach some places such as urban canyons and the indoor environment that may not be reachable by a line-of-sight system such as GPS.

Fourth, these parameters can be extracted from the navigation signals even indoors. This is desirable as many of the anticipated applications of geoencryption will likely occur indoors. This includes applications such as the management and distribution secure digital data. Often, it is desired that this data is accessible only inside a certain building.

Figure 5:
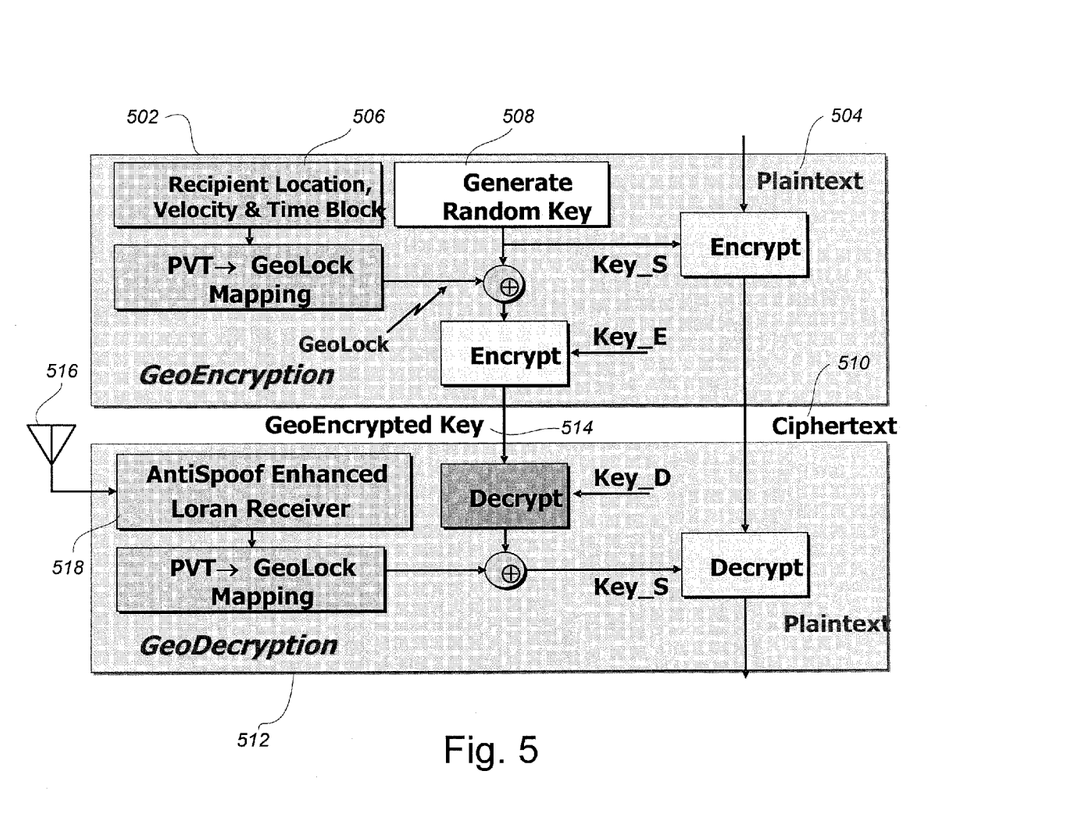
FIG. 5 illustrates an exemplary embodiment of a geoencryption system in accordance with the present invention.

Finally, Loran has a data channel that can carry authentication and time messages. Both are important to the authentication scheme of this invention. The authentication message is used to verify the source of the Loran signals and the time message serves to synchronize the user and the Loran transmitter FIG. 5 illustrates an exemplary embodiment of a geoencryption system in accordance with the present invention. The encryption block 502 generates a location-dependent cryptographic key based on position data 506 associated with the intended recipient. This location-dependent key is combined with a random key 508 which in turn is used to encrypt the plaintext 504. The encrypted ciphertext 510 is then transmitted to the decryption block 512. However, before the ciphertext 510 can be decrypted, the geoencrypted key 514 must be decrypted with the precise location-dependent parameters used to encrypt the key. To do so, an antenna 516 receives Loran navigational signals, which are then processed by a Loran receiver 518 to create a decryption key composed of a large number of location-dependent parameters as illustrated in FIG. 6.

Figure 6:
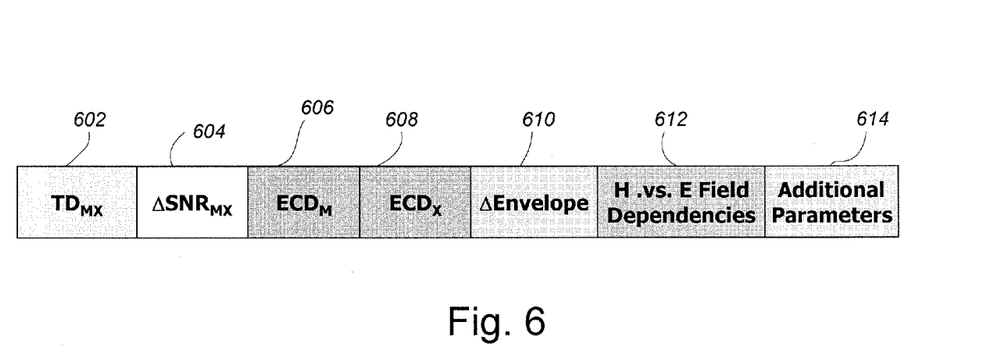
FIG. 6 illustrates a number of Loran navigational signal parameters that are used to increase the entropy of the cryptographic key in accordance with the present invention.

FIG. 6 represents a set of exemplary Loran signal parameters that can be used to increase the entropy of the cryptographic key, thus resulting in a very strong and robust encryption. In addition to the time differences 602 from multiple Loran transmitters used to calculate position, several additional parameters can be used to characterize the signature of a particular location. The parameters shown make it harder to spoof based on location by introducing into the signature hard-to-predict but stable propagation anomalies measured by the receiver. For example, in addition to the time difference 602 between two Loran transmitters, the geoencryption module 502 also uses the relative signal-to-noise ratio 604 of two stations, the received carrier envelope differences (ECD) 606 and 608, the pulse shape differences 610 extending out beyond 30 microseconds, where structures in the local environment begin to have an effect, magnetic and electric field dependencies 612, and any other signal parameters 614 that exhibit a stable location dependence.

Figure 7:
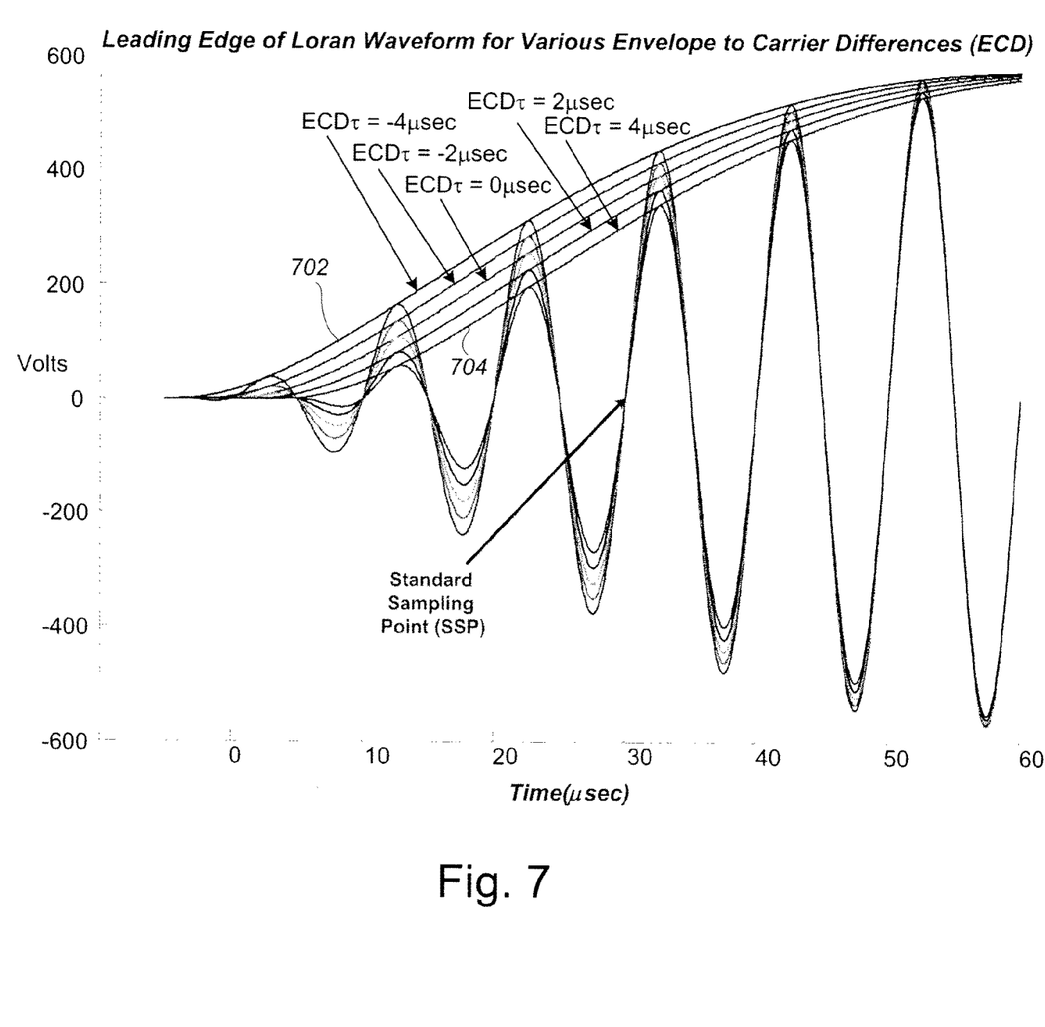
FIG. 7 illustrates an exemplary navigation signal parameter, the ECD, that is used to generate the cryptographic key in accordance with the present invention.

FIG. 7 illustrates one such parameter that exhibits a stable location dependence while not directly providing position data, the ECD. Shown in the figure are the leading edges of the Loran waveform for various envelope-to-carrier differences (ECDs). Time differences in the leading edge of 8 μsec are illustrated between an early edge 702 and a late edge 704, depending on the actual waveform of the Loran pulse. This waveform is sensitive to multipath effects as the signal propagates from the transmitter to the receiver. These effects are difficult to predict yet relatively stable with time, producing observables that can be used to increase the entropy of cipher keys while at the same time making spoofing more difficult. The waveform may also be affected by dispersive channel effects that may exhibit some time dependence, but as long as this effect remains relatively small, this parameter is a useful location-dependent parameter to use as part of the cipher key.

Figure 8:
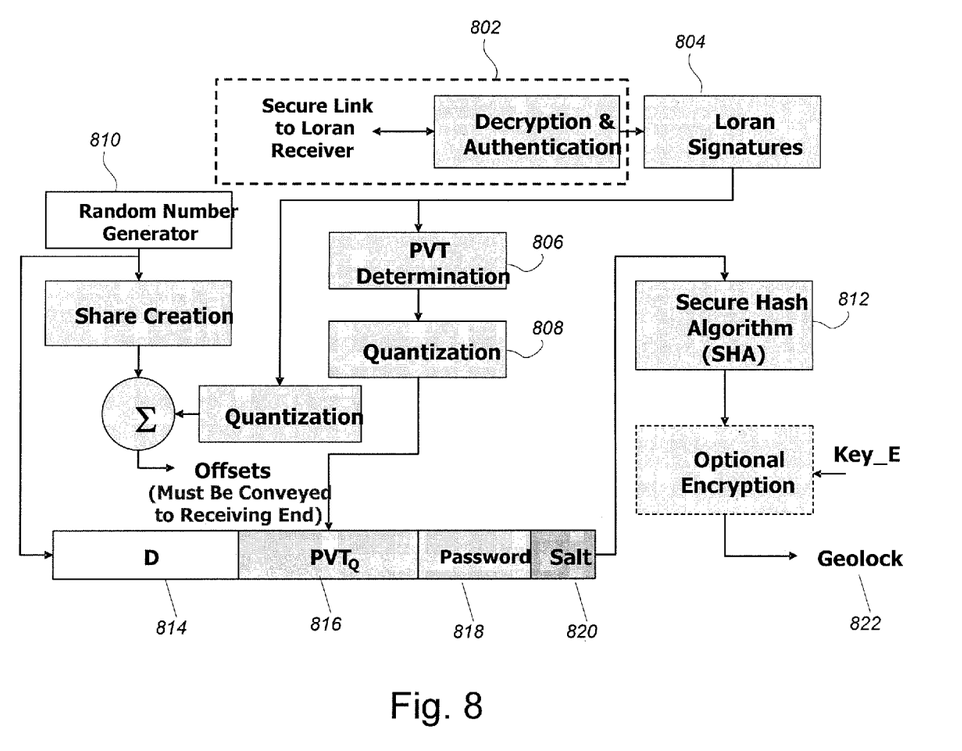
FIG. 8 depicts a block diagram of an embodiment of the sending side of a geoencryption system in accordance with the present invention.

FIG. 8 depicts a block diagram of an embodiment of a geoencryption system in accordance with the present invention. Shown in the figure is the generation of the geolock at the sending end. A secure link to a Loran receiver 802 acquires navigation signal parameters that include not only position determination, but also various other characteristics of the navigation signals, as described above. The Loran signatures 804 are used for determination of position, velocity, and time parameters (PVT) 806, which are then quantized 808 and inserted into the encryption key bitstream 816. A random number generator 810 creates a random string 814 to further secure the encryption key, and a password 818 and a salt 820 are further incorporated into the encryption bitstream. The salt is essentially a string of known but arbitrary bits that impedes dictionary attacks by being appended to the password before hashing. The entire bitstream, incorporating a random key 814, geographic and time data along with navigation signal parameters 816, the password 818, and the salt 820 are all fed through a secure hashing algorithm 812 to create the geolock 822. This geolock would then be used to encrypt a plaintext file to be delivered securely to an authorized user at a specific time and place.

Figure 9:
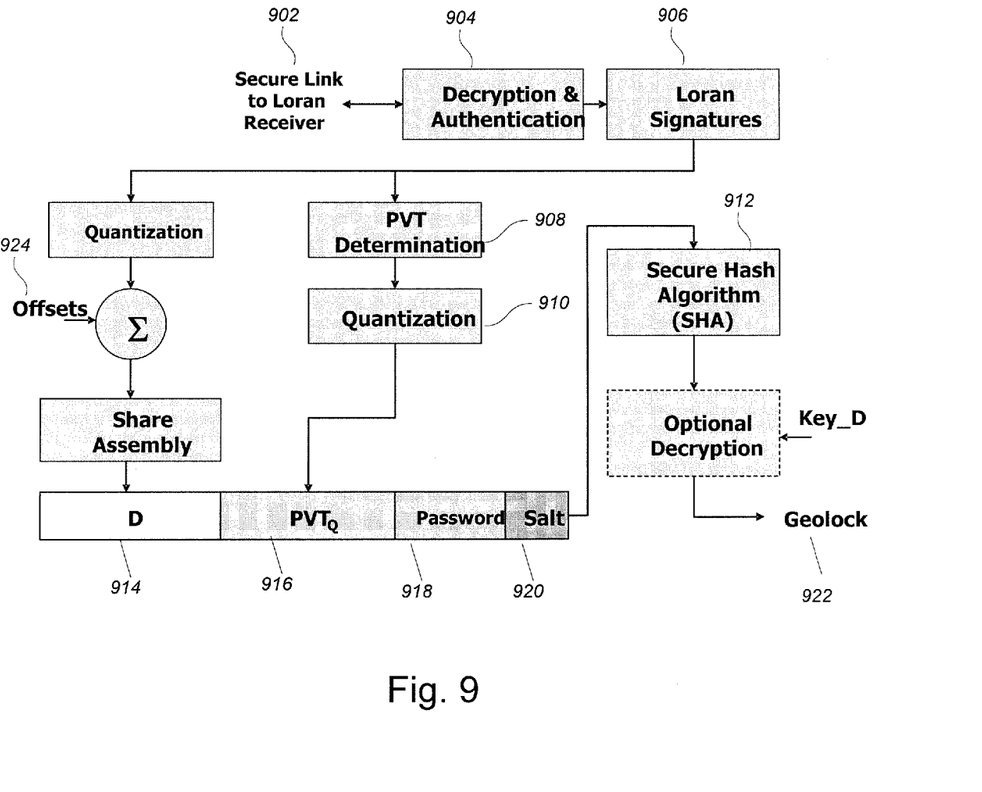
FIG. 9 depicts a block diagram of an embodiment of the receiving side of a geoencryption system in accordance with the present invention.

FIG. 9 depicts the regeneration of the geolock on the receiver side of a geoencryption system in accordance with the present invention. A secure link to a Loran receiver 902 provides location and time data as well as navigation signal parameters as described above. The Loran signatures 906 are then used to create position, velocity, and time determinations 908, which are then quantized 910 to become part of the cipher key 916. The Loran signatures 906 are also quantized and summed with offsets 924 communicated by the sending side. As for the sending side, the cipher key comprises a random piece 914, a position, velocity, and time piece 916 which also includes navigation signal parameters, a password piece 918, and a salt 920. The bitstream is sent through a secure hash algorithm 912 to create a matching geolock 922 that can then be used to decrypt ciphertext transmitted by the sender. Note that if the geographic signature or other location-dependent parameters used to regenerate the cipher key to not match those used to encrypt the plaintext, the decryption will fail, even if the attempt is made by an authorized user.

As alluded to earlier, another goal of the present invention is not only to increase the entropy of the cipher key by incorporating additional location-dependent parameters but also to increase the robustness of the geoencryption system against tampering or spoofing of the location signals. In order to accomplish this, an embodiment of a geoencryption device in accordance with the present invention is adapted to use a signal authentication protocol termed Timed Efficient Stream Loss-tolerant Authentication, or "TESLA."

The purpose of geoencryption is to provide security to the transmission of information. As such, it is important that every link of the geoencryption chain is secure. This includes not only the protocol itself but also the broadcast of the RF signal. The security of the RF navigation signal is provided by message authentication, which concerns verifying the source of the data or messages. One goal is to prevent the user from being fooled into believing that a message comes from a particular source when this is not the case. Another goal is to allow the receivers to verify whether the messages have been modified during transmission.

The main challenge of secure broadcast communication is source authentication, and the problem is complicated by untrusted or uncertified users and unreliable communication environments. The concern is that untrusted users may employ items such as a signal simulator to spoof the system into generating the correct geolock. Source authentication helps the receivers to verify that the received data originates from the source and that data has not been modified in transit.

Adding security in a broadcast communication system is difficult because symmetric authentication algorithms are fast and efficient but not as secure as asymmetric ones in a broadcast setting; on the other hand, the asymmetric authentication algorithms are secure but not efficient. To address these concerns, an embodiment of a geoencryption system in accordance with the present invention uses TESLA on Loran to provide authentication and improve system integrity. TESLA uses a symmetric authentication mechanism and appends a MAC at the end of each message that is transmitted from a sender to a receiver. It further uses time (delayed key disclosure) to achieve the asymmetry property required for a secure broadcast authentication. The main features of TESLA are low sender and receiver computation overhead, low communication overhead, and perfect robustness to message loss. It requires buffering for both sender and receiver sides, but the receiver can authenticate the message as soon as enough messages, keys and MACs are buffered.

Enhanced Loran will transmit data via a data channel. The current proposal is ninth-pulse modulation. The modulation is chosen to minimize the impacts on the current operational Loran signal. An additional pulse is inserted after the eighth pulse of a pulse group of secondary stations. Thirty-two-state pulse-position modulation (PPM 32) is used to vary the time delay of the ninth pulse away from 1000 microseconds after the eighth navigation pulse. The delays of the 32 symbols are given by the following expression from zero-symbol offset:

$$d_i = 1.25 \bmod(i, 8) + 50.625 \, \text{floor}\left(\frac{i}{8}\right)$$

Under the current proposed ninth-pulse communications, each Loran message has 120 bits and consists of a 4-bit header, a 41-bit payload, and 75-bit parity component. Some of the message types have been defined such as differential Loran corrections which provide phase correction at known reference sites, almanac, message for government use and time of the day. There are some types that are undefined and reserved for future use. Reed-Solomon codes are used for parity check. This forward error correction coding method provides error correction capacity and integrity. It provides to ability to align the message and to verify that the message has been validly decoded with high probability.

Figure 10:
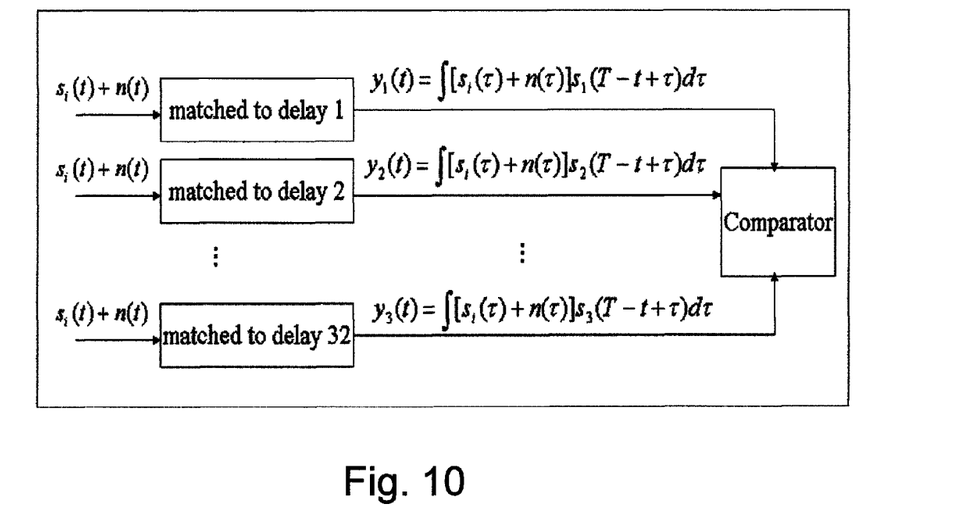
FIG. 10 depicts the design of a matched filter used to demodulate the ninth-pulse signal of an enhanced Loran broadcast in accordance with the present invention.

In an embodiment of a geoencryption system in accordance with the present invention, the demodulation of Loran signals is performed using a matched filter, as depicted in FIG. 10. The matched filter performs convolutions of the time-reversed version of a reference signals with the input signal. The demodulation process is complicated by the presence of noise and interference on the input signal. Multiple matched filters, each referenced to a specific state, are used. The input signal passes through each matched filter. A comparator is used to compare the values after the filters, and the maximum value determines the delay and thus the symbol modulated on the pulse.

Figure 11:
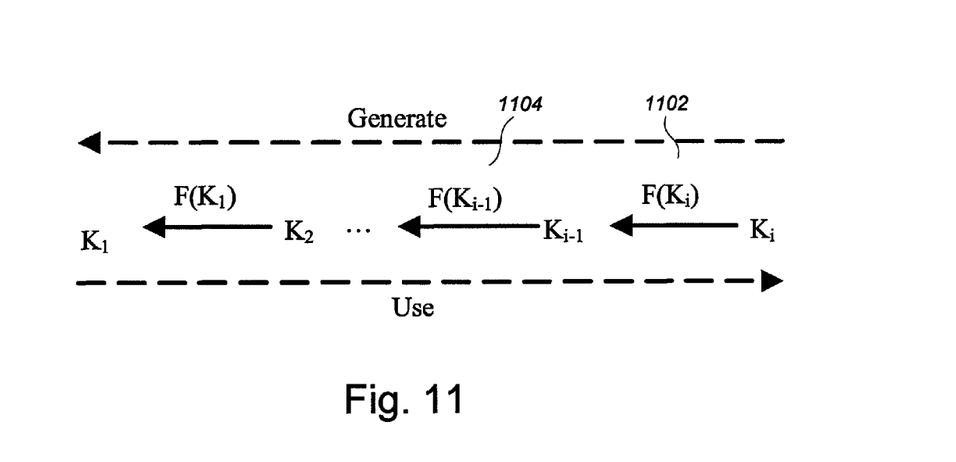
FIG. 11 illustrates the construction of a one-way key chain used to authenticate a navigation signal broadcast in accordance with the present invention.

The Loran transmitter and the receiver are loosely synchronized in time. The synchronization does not have to be precise but the receiver knows an upper bound on the sender's local time. Therefore, the receivers incorporate a secure time channel, either using Internet or Loran time message to achieve this goal. The TESLA approach comprises one-way key generation, MAC key generation, MAC generation, a broadcast stage, key verification, and MAC verification. These steps are described in more detail below:

One-way key chain generation: A TESLA chain of size N is selected. The transmitter generates a one-way chain of N self-authenticating values or keys, denoted K1, ..., KN, and assigns the keys to the N segments sequentially. One segment is the time interval necessary for one authentication message. A hash function is used to construct the one-way chain and derives from the base key, KN. The other keys Ki are generated from N−i hashes of KN. Notationally, $Ki=F(Ki+1)=F(F \ldots F(KN))$ where there are N−i instances of the hash function F. FIG. 11 illustrates the construction of a one-way key chain and F indicates the hash function used. When the keys are broadcast, the chain is sent in the reverse order of generation. The ith element of the key is hashed at step 1102, and the (i−1)th element is hashed at step 1104.

MAC key generation: The transmitter uses a different hash function F' to hash the last one-way chain values, resulting in the keys, K1', ..., KN', used to form MACs.

Figure 12:
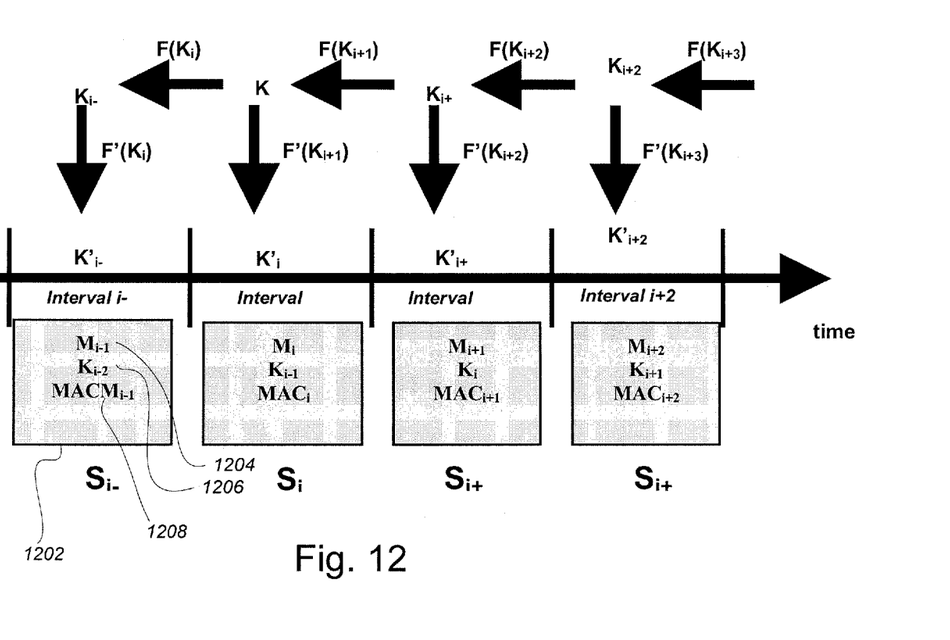
FIG. 12 illustrates the process by which a MAC code is generated and used to authenticate a broadcast from a navigational device in accordance with the present invention.

MAC generation: The transmitter computes the MACs over the contents of the messages and keys and attaches them to each packet. Each segment thus includes the message, the MAC for this message and the key for a previous MAC. The transmitted keys are the first one-way chain values. FIG. 12 illustrates this process in which a key disclosure delay of one segment is used. For example, Ki is not disclosed in the segment of Mi but in the segment of Mi+1.

Broadcast stage: The messages, keys and MACs are transmitted in segments, for example 1202. Each segment 1202 consists of a message 1204, a MAC 1208 and a key 1206 associated with the message in the previous segment, as shown in FIG. 12.

Key verification: Each receiver buffers the segments first. The first step is to verify the received key values. This is done by hashing the key in current segment and comparing it with the key in previous segment.

MAC verification: Each receiver then checks the correctness of the MAC of the buffered segments after the keys are verified. If the MAC is correct, the receiver accepts the segment.

Figure 13:
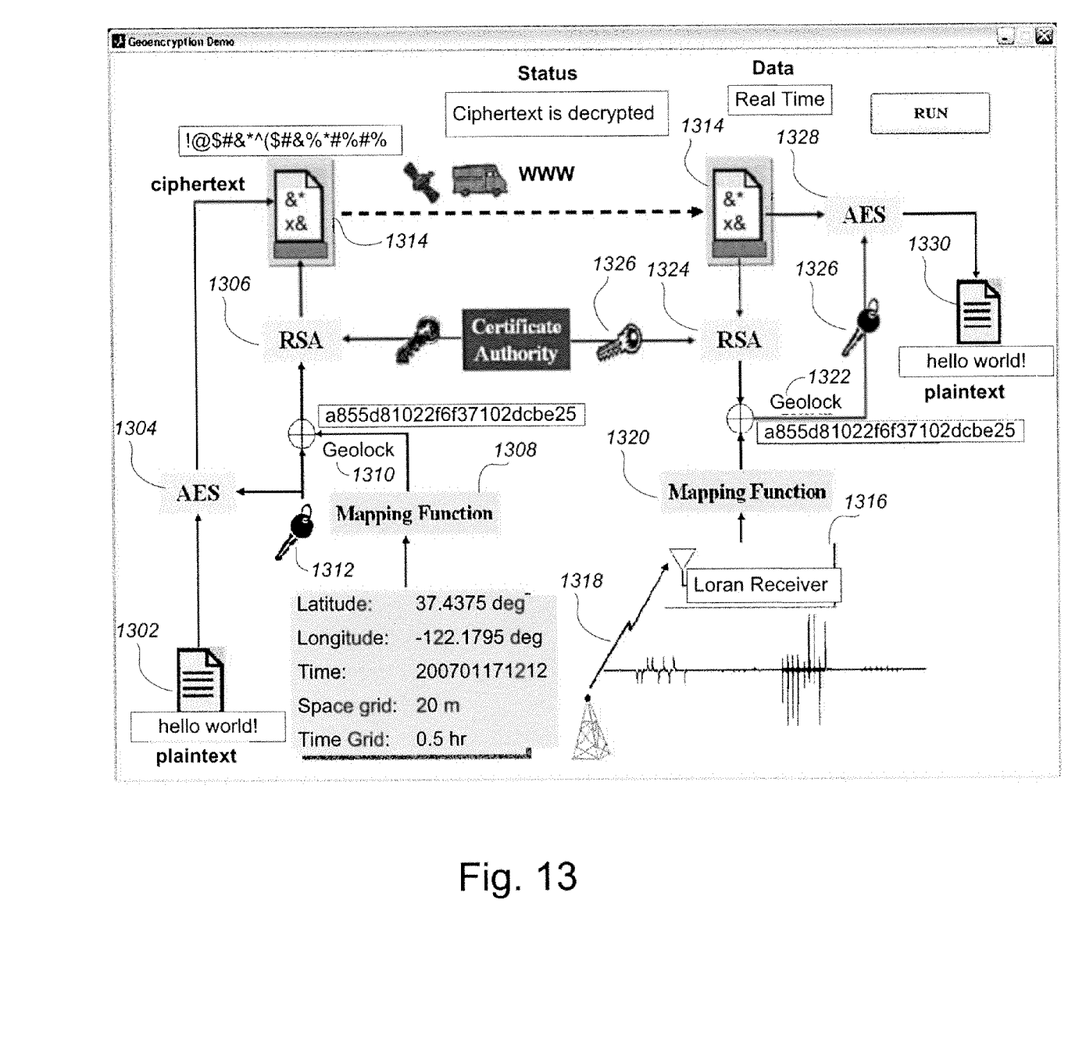
FIG. 13 is a block diagram of a geoencryption system in accordance with the present invention that makes use of Loran navigation signal parameters to create a robust and strong cryptographic key and geolock.

FIG. 13 is a block diagram of a geoencryption system in accordance with the present invention that makes use of Loran navigation signal parameters to create a robust and strong cryptographic key and geolock. Plaintext 1302 is encrypted by symmetric cipher, AES 1304, for plaintext encryption, asymmetric cipher, RSA 1306, for random key encryption, and a mapping function 1308 for geolock 1310 generation. The sender creates the plaintext 1302 and enters the location information of the recipient as an input to the mapping function 1308. For purposes of illustration, the parameters used to compute the geolock are latitude in degrees, longitude in degrees, time, space grid size in meters and time grid size in hours. In practice, the mapping function includes navigation signal characteristics of the target location.

The sender first generates a random key. He takes the plaintext 1304 and the random key 1312 as inputs to AES 1304 to generate ciphertext 1314. The location information goes into the mapping function 1308 and a geolock 1310 is computed. Next, the random key 1312 is first XORed with the geolock 1310 and this geolocked key is encrypted using RSA 1306. The recipient then uses a Loran antenna and receiver 1316 to capture Loran signals 1318 and decode Loran messages. The receiver performs TESLA authentication using the decoded messages. Once the authentication is verified, the receiver estimates user location and location-dependent parameters using a mapping function 1320 and the uses this information to compute a geolock 1322. The recipient then decrypts the encrypted key using RSA 1324 and a private key 1326. This is then XOR'd with the geolock 1322 to generate the random key 1326. At last, this decrypted random key 1326 is used to decrypt the ciphertext 1314 using AES 1328. The original plaintext 1330 is thus recovered by the recipient.

While the prior discussion has focused on methods for increasing geolock entropy using location-dependent Loran signal features or RF fingerprints, an extension of this approach to encompass additional fixed terrestrial RF sources would fall within the scope and spirit of the present invention. For example, location-dependent fingerprints may be established for many signals that are not navigation signals per se, such as cellular, television, WiFi, WiMax, and other radio-broadcast signals. If the propagation channels for these signals are relatively stable with respect to a particular geographic location, signal parameters can be estimated and used as a location-dependent fingerprint to add entropy to a geolock code. Similarly, transmitter-specific artifacts may also be used as part of the fingerprint derivation process in a manner reminiscent of radar fingerprinting techniques used by some ELINT (Electronic Intelligence) systems to identify particular radars.

In conclusion, a novel method and system makes use of all location-dependent parameters of a navigation signal to significantly increase the entropy of the cryptographic key and to perform cross correlations of navigation parameters to authenticate the source of location data in order to generate a strong and robust cryptographic system. Having thus described preferred embodiments of a geoencryption system making use of navigation signal parameters, it should be apparent to those skilled in the art that certain advantages of the above-described system have been achieved. It should also be appreciated that various modifications, adaptations, and alternative embodiments thereof may be made within the scope and spirit of the present invention.

What is claimed is:

1. A data encryption and decryption system comprising:
   a geoencryption apparatus including:
   a data file to be securely transmitted;
   a random key for encrypting the data file to be securely transmitted;
   an encryption device, adapted to encrypt the data file with the random key to create a coded file; and
   a geocoding device, adapted to geolock the random key by encoding it with a location-dependent navigation signal, wherein the geolocking process depends on a time difference of arrival (TDOA) of the location-dependent navigation signal and at least one of the following stable propagation anomalies of the location-dependent navigation signal:
an envelope-to-carrier difference (EDC);
a differential signal-to-noise ratio (DSNR);
a signal envelope shape; and
a direction of arrival of the navigation signal; and
a geo-decryption apparatus including:
a data receiver adapted to receive the coded file;
a navigation receiver adapted to receive the location-dependent navigation signal and to measure the at least one stable propagation anomaly; and
a geodecoding device, adapted to unlock the random key by decoding it with the location-dependent navigation signal, wherein the decoding process depends on the at least one stable propagation anomaly comprising at least one of the EDC, the DSNR, the signal envelope shape, and the direction of arrival of the navigation signal.

2. The data encryption and decryption system of claim 1, wherein the geoencryption apparatus and the geodecoding device depend in part on the envelope-to-carrier difference (ECD), wherein the ECD depends on multipath effects experienced by the navigation signal as it propagates from a navigation transmitter to the navigation receiver.

3. The data encryption and decryption system of claim 1, wherein the geoencryption apparatus and the geodecoding device depend in part on the signal envelope shape, wherein the signal envelope shape depends on structures in a local environment near the navigation receiver.

4. The data encryption and decryption system of claim 1, wherein the geoencryption apparatus and the geodecoding device depend in part on the differential signal-to-noise ratio at the navigation receiver between a first signal broadcast by a first navigation transmitter and a second signal broadcast by a second navigation transmitter.

5. The data encryption and decryption system of claim 1, wherein the geoencryption apparatus and the geodecoding device depend in part on the direction of arrival at the navigation receiver of the navigation signal broadcast by a navigation transmitter.

6. The data encryption and decryption system of claim 1, wherein the navigation signal comprises at least one of a LORAN signal, a cellular transmission signal, a television signal, a WiFi signal, a WiMax signal, and a radio broadcast signal.

7. In a geoencryption system comprising a geocoding device and a geo-decryption device including a navigation receiver configured to receive a location-dependent navigation signal, a method of improving data security by increasing entropy of the geoencryption system includes the steps of:
encrypting a data file with a random key;
geolocking the random key by encoding it with the location-dependent navigation signal, wherein the encoding depends on a time difference of arrival (TDOA) of the location-dependent navigation signal and a stable propagation anomaly of the location-dependent navigation signal that is at least one of:
an envelope-to-carrier difference (EDC);
a differential signal-to-noise ratio (DSNR);
a signal envelope shape; and
a direction of arrival of the navigation signal;
receiving the encrypted data file at the geo-decryption device;
receiving the location-dependent navigation signal at the geo-decryption device and measuring the stable propagation anomaly;
unlocking the random key by decoding it with the location-dependent navigation signal and the measured stable propagation anomaly; and
de-encrypting the encrypted data file with the unlocked random key.

8. The method of improving data security of claim 7, wherein the step of geolocking the random key further comprises using the envelope-to-carrier difference (ECD) to encode the random key, wherein the ECD depends on multipath effects experienced by the navigation signal as it propagates from a navigation transmitter to the navigation receiver.

9. The method of improving data security of claim 7, wherein the step of geolocking the random key further comprises using the signal envelope shape to encode the random key, wherein the signal envelope shape depends on structures in a local environment near the navigation receiver.

10. The method of improving data security of claim 7, wherein the step of geolocking the random key further comprises using the differential signal-to-noise ratio at the navigation receiver between a first signal broadcast by a first navigation transmitter and a second signal broadcast by a second navigation transmitter to encode the random key.

11. The method of improving data security of claim 7, wherein the step of geolocking the random key further comprises using the direction of arrival at the navigation receiver of the navigation signal broadcast by a navigation transmitter to encode the random key.

12. In a geoencryption system comprising a first data packet to be transferred, a later data packet to be transferred, a geocoding device and a geo-decryption device including a navigation receiver configured to receive a location-dependent navigation signal, a method of improving data security using Timed Efficient Stream Loss-tolerant Authentication (TESLA) includes the steps of:
geolocking a random key by encoding it with the location-dependent navigation signal and a stable propagation anomaly of the location dependent navigation signal;
appending a first message authentication code (MAC) to the first data packet to be transferred, wherein the first MAC is generated according to the steps of:
appending a first encryption key to a copy of the first data packet to be transferred to create a variable length input; and
creating a one-way hash of the variable length input by applying a hash function to create the first MAC;
transmitting the first data packet with the appended first MAC to the geo-decryption device;
repeating the step of appending a later MAC to the later data packet to be sent;
transmitting the later data packet with the appended later MAC along with the first encryption key to the geo-decryption device;
at the geo-decryption device, using the first encryption key received with the later data packet to authenticate the first data packet; and
unlocking the random key by decoding it using a measurement of the stable propagation anomaly.

13. The method of improving data security of claim 12, further comprising the steps of:
creating a segment of N data packets to be transferred, where N is an integer greater than 1, wherein the later data packet to be transferred is the Nth data packet in the segment;
generating a base key, K(N);
generating an (N−1)th key K(N−1) by applying a key hash function to the base key K(N);

generating an (N−2)th key K(N−2) by applying the key hash function to key K(N−1);

iteratively generating a (N−i)th key K(N−i) by applying the key hash function to key K(N−i+1), where i is an integer less than N, until key K(1) is generated;

creating the first MAC by appending K(1) to the first data packet to be transferred;

repeating the step of creating a MAC until the Nth MAC is created by appending K(N) to the Nth data packet;

transmitting the first data packet with the appended first MAC;

transmitting the second data packet with the appended second MAC and the first key K(1);

repeating the transmitting step until the Nth data packet is transmitted with the Nth appended MAC and the (N−1)th key K(N−1).

14. The method of improving data security of claim 12, wherein the first data packet to be transferred is further geoencrypted by the steps of:

encrypting the first data packet with a random key;

geolocking the random key by encoding it with the location-dependent navigation signal, wherein the encoding depends on a stable propagation anomaly of the location-dependent navigation signal that it at least one of:
a time difference of arrival (TDOA);
an envelope-to-carrier difference (EDC);
a differential signal-to-noise ratio (DSNR);
a signal envelope shape; and
a direction of arrival of the navigation signal;

receiving the encrypted data file at the geo-decryption device;

receiving the location-dependent navigation signal at the geo-decryption device and measuring the stable propagation anomaly;

unlocking the random key by decoding it with the location-dependent navigation signal and the measured stable propagation anomaly; and de-encrypting the encrypted data packet with the unlocked random key.

15. The method of improving data security of claim 14, wherein the step of geolocking the random key further comprises using the time difference of arrival (TDOA) at the navigation receiver between a first signal broadcast by a first navigation transmitter and a second signal broadcast by a second navigation transmitter to encode the random key.

16. The method of improving data security of claim 14, wherein the step of geolocking the random key further comprises using the envelope-to-carrier difference (ECD) to encode the random key, wherein the ECD depends on multipath effects experienced by the navigation signal as it propagates from a navigation transmitter to the navigation receiver.

17. The method of improving data security of claim 14, wherein the step of geolocking the random key further comprises using the signal envelope shape to encode the random key, wherein the signal envelope shape depends on structures in a local environment near the navigation receiver.

18. The method of improving data security of claim 14, wherein the step of geolocking the random key further comprises using the differential signal-to-noise ratio at the navigation receiver between a first signal broadcast by a first navigation transmitter and a second signal broadcast by a second navigation transmitter to encode the random key.

19. The method of improving data security of claim 14, wherein the step of geolocking the random key further comprises using the direction of arrival at the navigation receiver of the navigation signal broadcast by a navigation transmitter to encode the random key.

* * * * *